United States Patent [19]

Nii

[11] Patent Number: 4,699,489

[45] Date of Patent: Oct. 13, 1987

[54] FILM WINDING MEMBER

[75] Inventor: Tamotsu Nii, Tokyo, Japan

[73] Assignee: Konishiroku Photo Industry Co., Ltd., Tokyo, Japan

[21] Appl. No.: 912,527

[22] Filed: Sep. 24, 1986

Related U.S. Application Data

[63] Continuation of Ser. No. 388,960, Jun. 16, 1982, abandoned, which is a continuation-in-part of Ser. No. 206,889, Nov. 14, 1980, abandoned.

[30] Foreign Application Priority Data

Nov. 19, 1979 [JP] Japan ................................ 54-148873

[51] Int. Cl.⁴ ............................................... G03B 1/04
[52] U.S. Cl. .................................................... 354/212
[58] Field of Search ............... 354/212, 213, 214, 173, 354/341; 242/71.2, 71.3, 71.4, 71.5, 74, 68.5

[56] References Cited

U.S. PATENT DOCUMENTS

| | | | |
|---|---|---|---|
| 1,386,617 | 8/1921 | Gunderman | 242/74 |
| 2,078,432 | 4/1937 | Whitlock | 242/71.3 |
| 2,911,163 | 11/1959 | Warrick | 242/74 |
| 3,465,657 | 9/1969 | Welzel et al. | 354/212 |
| 3,484,053 | 12/1969 | Rehn et al. | 242/74 |
| 3,493,161 | 2/1970 | Billings et al. | 242/68.5 X |
| 3,499,376 | 3/1970 | Swift | 354/211 |
| 4,274,726 | 6/1981 | Yoneyama et al. | 354/212 X |
| 4,310,233 | 1/1982 | Okuyama et al. | 354/212 |

FOREIGN PATENT DOCUMENTS 1325437 3/1963 France ................................ 354/173

OTHER PUBLICATIONS

*Mechanical Engineer's Handbook*, Ed. by Lionel S. Marks, McGraw-Hill Co., N.Y., N.Y., 1951, p. 728, (Marks' Handbook).

Primary Examiner—Michael L. Gellner
Attorney, Agent, or Firm—Jordan B. Bierman

[57] ABSTRACT

A film winding member for a camera includes a lower disposed portion of widened diameter for initial contact with the leading end of the film. Both the widened diameter portion and the relatively narrower remainder of the film winding member present uninterruptedly smooth and continuous surfaces about which the film is operatively wound. The peripheral surface of the film winding member is formed of a material having a coefficient of sliding friction or at least 1.5, and preferably of silicone rubber having such a coefficient of sliding friction.

7 Claims, 3 Drawing Figures

FILM WINDING MEMBER

This application is a continuation of application Ser. No. 388,960 filed June 16, 1982 and presently abandoned, which is a continuation-in-part of application Ser. No. 206,889 filed Nov. 14, 1980 and presently abandoned, which claims priority of Japanese Application 148873/1979 filed Nov. 19, 1979.

BACKGROUND OF THE INVENTION

1. Field of the Invention

The present invention relates to an automatic loading and winding device in a camera and, more particularly, to a film winding member thereof.

2. Description of the Prior Art

An automatic film loading device for a camera wherein a film cartridge is used is provided in the construction of U.S. Pat. No. 4,274,726. The device therein disclosed is so constructed that the film is automatically wound round the spool if the leading edge of the film extending from the cartridge is placed on the sprocket when the back lid of the camera is opened and the film cartridge is loaded, and the back lid is then closed. In such device, the perforations on the film leading edge (which is generally of narrowed width with perforations along one side only) are engaged with the teeth of the sprocket and the film end is fed onto the spool by rotation of the sprocket during the film winding operation; the leading edge of the film is thereby wound round the spool by some means or other when the leading edge of the film contacts the external surface of the spool.

As a means to wind the leading edge of the film round the spool, it is advantageous to utilize frictional forces because the structure is simple and its operation reliable.

One example among automatic loading devices will be shown. The narrowed leading end A of the film, fed in the direction of the reference arrow by rotation of sprocket 1 (FIG. 1), is bent along the wall surface 2 in the film winding chamber 14 or the guide plates 16 and 21 and is guided onto and about the circumference of the film winding member or spool 3. Incidentally, it is desirable that the peripheral surface of film winding member 3 be smooth and without irregularity. The film, as described later, is pressed against film winding member 3 by pressing rollers 4 and 19 arranged at suitable positions such as on a back lid and is caused to contact the film winding member through friction.

The film winding member 3 is equipped with an inner tube 5 having a flange 5a at its bottom and formed of rigid material such as metal, and an outer tube 6 that closely contacts the external surface of the inner tube 5, as shown in FIG. 1.

The outside diameter of a lower edge portion 6a of outer tube 6 near flange 5a is larger (the difference in diameter may, for example, be about 0.2–0.4 mm) than the remaining portion 6b thereof. More particularly, a double coated adhesive tape (FIG. 2) of a predetermined thickness (for example about 0.2–0.4 mm) is attached to the external surface at one end of inner tube 5 and both inner tube 5 and double-coated adhesive tape 7 are sheathed by a rubber outer tube 6 of uniform thickness. As shown in FIG. 2, it is desirable that the width B of the larger diamter portion 6a be smaller than the distance L between the edge of the narrowed leading end of the film and the farther side of the perforations a disposed along said edge of the film.

The film winding member 3 is rotated and driven by a direct-current motor M inserted concentrically within inner tube 5. Namely, a pinion 8 on the output shaft of motor M is engaged with a gear 10 on a shaft 9 rotatably mounted on the camera body. A driving gear 11 mounted loosely on shaft 9 engages with an internal gear 12 of inner tube 5 and the construction is such that the rotating torque is transmitted to driving gear 11 from a friction disc 13 fixed on shaft 9, and film winding member 3 is thereby rotated and driven at a reduced speed. Incidentally, inner tube 5 and the casing structure for direct-current motor M may, of course, be constructed as a single body. Further, sprocket 1 and film winding member 3 are disposed in interlocking relation through an unillustrated gear train means and it is desirable that the ratio of the peripheral speed of sprocket 1 (for conveying an amount of film) to the peripheral speed of film winding member 3 (for winding an amount of film for rotation) is established to be 1:1.3–2.0.

Referring again to FIG. 1, pressing means 16 for winding film—the base part of which is rotably supported on the camera body by means of a shaft 15 in film winding chamber 14—is energized by a spring 17 in the direction of the reference arrow and supports, at the tip thereof, rollers 19 integrally formed with a metallic shaft 18. Rollers 19 are actually pressing members and the internal surface of the plate member that rotatably supports said rollers 19 defines a curved guide surface 16a. Incidentally, the positioning of rollers 19 is such that they are located outside the perforations along both edges of the film strip. In the present instance, the lower roller 19 contacts the larger diameter portion 6a of film winding member 3 and therefore, theoretically, only the lower portion of roller assembly 19 actually contacts film winding member 3, which causes no practical problem. On the other hand, pressing means 21 adapted for receiving the film and pivotally supported at its base portion by a shaft 20 provided on the camera back lid (not shown in the drawing) is energized by a spring 22 in the direction of the reference arrow and, at the far side thereof, pressing roller 4 is arranged on a rotatable metallic shaft 23. In this case, if there is no film around film winding member 3, pressing roller 4 alone contacts the external surface of film winding member 3 with pressure—serving as an actual pressing member—and the inside surface 21a of plate member 21 serves as a curved guide surface for the narrowed leading film end A. Therefore, the narrowed leading end A of the film fed by sprocket 1 is forced by curved guide surface 21a and guided against the external surface of film winding member 3 to be interposed between said external surface and pressing roller 4. It is desirable that the point of contact between pressing roller 4 and film winding member 3 be fixed near the point where the leading end of the film fed by sprocket 1 initially contacts the external surface of film winding member 3 in its natural state, and further that the point of contact between rollers 19 of pressing means 16 and the external surface of film winding member 3 be fixed at a position where the leading end of the film guided by inside wall surface 2 and the curved guide surface 16a of pressing means 16 naturally makes its way toward the external surface of film winding member 3. Incidentally, the strength of spring 17 and the strength of spring 22 are respectively fixed so that the pressing force of pressing means 16 for winding film is greater than that of pressing means 21 adapted for receiving the film.

Film winding chamber 14 is constructed so that the inside wall surface 2 runs parallel to the rotating shaft of film winding member 3 as shown in FIG. 2. Furthermore, at the position where the extreme tip of the cut off edge A' of the advancing narrowed leading film end A interposed between the external surface of the film winding member 2 and pressing roller 4 first contacts the inside wall surface 2 of the film winding chamber 14, there is provided a plate-shaped protruded piece 24 with a thickness of about 1 mm, for example. This protruded piece 24 must be of a shape and material that will not harm the tip and the back of the film; a synthetic resin material such as Moltoprene (a trademark of the Bayer Company of West Germany) may be used therefor. The thickness of protruded piece 24 prevents the narrowed leading film end A from rising up—which might otherwise occur because the pulling force exerted by sprocket 1 is located near the bottom edge of film A—by tilting or deflecting the narrowed leading film end A against the wall surface of the film winding chamber as shown in FIG. 2. And with respect to the size of protruded piece 24, 5 mm for its width and 10 to 15 mm for its length may, for example, be satisfactory.

In the illustrated example having the structure described above, the narrowed leading end A of the film is fed by sprocket 1 and is advanced into film winding chamber 14 along a curved path by its interposed relation between the external surface of film winding member 3 and pressing roller 4 of pressing means 21. The advancing film end A turns around film winding member 3 along the wall surface in the film winding chamber in the downwardly slanted or tilted direction shown in FIG. 2 by contact between the rear face of the narrowed leading film end and protruded piece 24. When the narrowed leading end A reaches pressing means 16, its extreme tip is guided by curved surface 16a to the external surface of film winding member 3 and the narrowed leading end of the film is interposed between the lower roller 19 and said external surface. The extreme tip of the narrowed leading end A continues to advance, receiving a strong pressing force from roller 19, and contacts or hits against the internal surface of the succeeding film portion (which is still of narrowed width) extending between sprocket 1 and film winding member 3 and, on being further guided by said internal surface of the film, reaches the point of contact between pressing roller 4 of pressing means 21 and the external surface of film winding member 3. Due to the action of protruded piece 24 in the downwardly slanted direction, there is neither fear that the corner of the extreme tip of the film will enter the perforation of the succeeding film strip portion nor is there fear of the film being spirally wound about spool 3. Further, since the pressing force applied to roller 19 of pressing means 16 for winding film is greater than the force of pressing roller 4 of pressing means 21, the extreme tip of the narrowed leading film end A that has encircled film winding member 3 enters between the succeeding film portion and film winding member 3 in such manner that it overcomes the pressing action of pressing roller 4.

Because the peripheral speed of film winding member 3 is greater than that of sprocket 1 and the friction force on the external surface of the film winding member is greater than the fricion force between both faces of the film at the position of pressing roller 4 for receiving film, the advancing speed of the extreme tip of the narrow leading film portion directly contacting the external surface of film winding member 3 is greater than the speed with which the succeeding film portion is advanced; as a consequence, the narrowed leading end A winding round film winding member 3 adheres or sticks gradually to the external surface of the film winding member 3—that is, the film is tightly wound around spool 3. In this case, due to the fact that the outside diameter of edge portion 6a of film winding member 3 is slightly larger than that of the remaining portion 6b, the narrowed leading film end A that is being tightly wound tends, as with an ordinary barrel-shaped pulley, to move toward the side of the large diameter portion 6a, and the lower side or lateral edge of the narrowed leading film end A thus locates surely on flange 5a. Therefore, the so-called "spiral phenomenon" can be affirmatively prevented. Further in the illustrated example, the position of pressing roller 4 of pressing means 21 at the receiving side is established near the cut off side edge of the narrowed leading end A (at nearly the center of the normal, full width of the film), and this is convenient for enabling the lower part of the narrowed leading end A to contact the large diameter portion 6a; this further accelerates the downward tilting of the surface of the narrowed leading end of the film by protruded piece 24 and is effective to prevent the occurrence of the "spiral phenomenon". However, when occasion demands, a pressing roller 4, for example, can be provided at both ends of shaft 23 as are the rollers 19 of pressing means 16 for winding film.

After the narrowed leading end A of the film is wound tightly around film winding member 3, the film is wound successively around the external surface of film winding member 3 frame by frame, being regulated by the rotating amount of sprocket 1 as in the case of ordinary film winding. At this time, the difference in peripheral speed between sprocket 1 and film winding member 3 is compensated by the slipping action of friction plate 13 although other means may also be provided therefor. In the illustrated example, incidentally, sprocket 1 is used for transporting the film but when unperforated film is used, a friction roller means may be provided. Further, it may be feasible that the narrowed leading end of the film be pulled out manually to the position of pressing means 21 for receiving film in advance, the back lid being then closed and the narrowed leading end of the film being automatically wound by rotation of the film winding member alone; it may further be feasible that pressing means 21 for receiving film be arranged on the camera body side and the leading end of the film fed into the film winding member side with one's fingertip with the back lid opened, the back lid being then closed after confirming that the narrowed leading end of the film is wound around the film winding member (where an automatic film winding mode operable with the back lid closed is not necessary).

Of course, where the narrowed leading end of the film is wound about the film winding member by a motor drive, a so-called idle transporting means for continuously winding the first several frames may also be included.

the protruded piece 24 must not be adhesive in nature (so that the film will not stick to it), and it may be formed unitarily as one body together with the film winding chamber; a hard material such as metal can be used as the material of construction of piece 24. In addition, the inside wall surface 2 of film winding chamber 14 need not necessarily be parallel with the shaft of film winding member 3 and, when occasion demands, it is possible to jointly provide protruded piece 24 and a tapered wall surface.

For sure action in such film winding, it is clear that a relatively large coefficient of sliding friction between the film A and the surface of film winding member 3 is an indispensable condition. In an ordinary camera, such film winding member is formed of metal or of hard synthetic resins and the coefficient of friction of such materials is too small whereby uncertain action is caused.

SUMMARY OF THE INVENTION

It is therefore an object of the present invention to eliminate the aforementioned problems concomitant with the operation of an ordinary camera in which the film winding member is formed of metal or of hard synthetic resins having a low coefficient of friction.

According to the present invention, as a material for the surface of the outer tube of the film winding member, an elastic material is desirable and it has been experimentally determined that a coefficient of sliding friction of greater than 1.5 for such material is satisfactory.

DESCRIPTION OF THE PREFERRED EMBODIMENT

The inventor of the present invention has performed a test involving film winding by assembling a reel with an outside diameter of 17 mm and a width of 34 mm incorporated in a camera and using various kinds of rubber material such as natural rubber, urethane rubber, chloroprene rubber, ethylene vinyl acetate rubber, silicone rubber and neoprene butadiene rubber as an elastic material.

As a result thereof, it has become clear that sure operation is obtained when the coefficient of sliding friction is greater than 1.5, but that with respect to ethylene vinyl acetate rubber, it was not possible to obtain such material with a coefficient of friction in the desired range because it is too hard.

For selection of the material, it is necessary to consider the problems of accuracy in the dimensioning of the product and of photographic fogging of the film. Taking these considerations into account, silicone rubber and neoprene butadiene rubber are the most desirable and practical materials. In the case of a film winding member used in a movie projector, its ordinary use is at room temperature and the effect of temperature is accordingly not great. However, a camera is often used in the open air and since such use may take place anywhere from the tropics to an area of bitter cold, a change in the material's hardness caused by a change in temperature of the elastic material—and a corresponding change in its frictional resistance caused by said change in hardness—are factors that can not be ignored.

Figure 1:
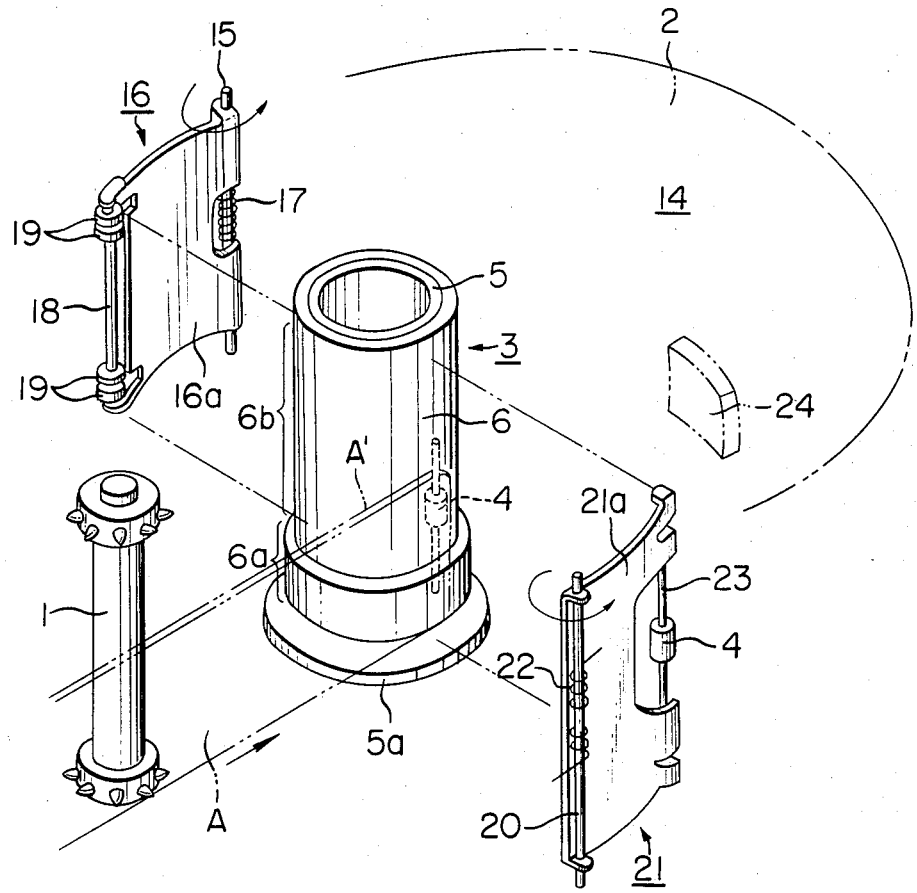
FIG. 1 is an exploded, elevated perspective view diagrammatically illustrating functional operation of an automatic film loading mechanism utilizing the film winding member of the present invention.
Figure 2:
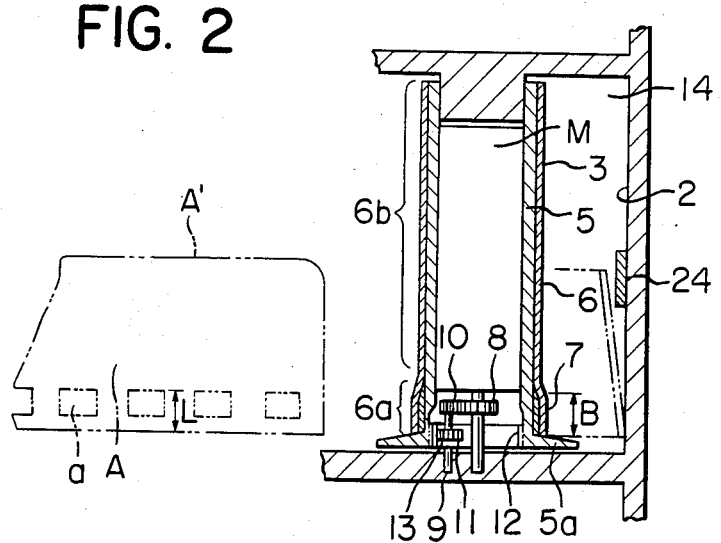
FIG. 2 is a sectional view of the primary parts of the automatic film loading mechanism of FIG. 1.
Figure 3:
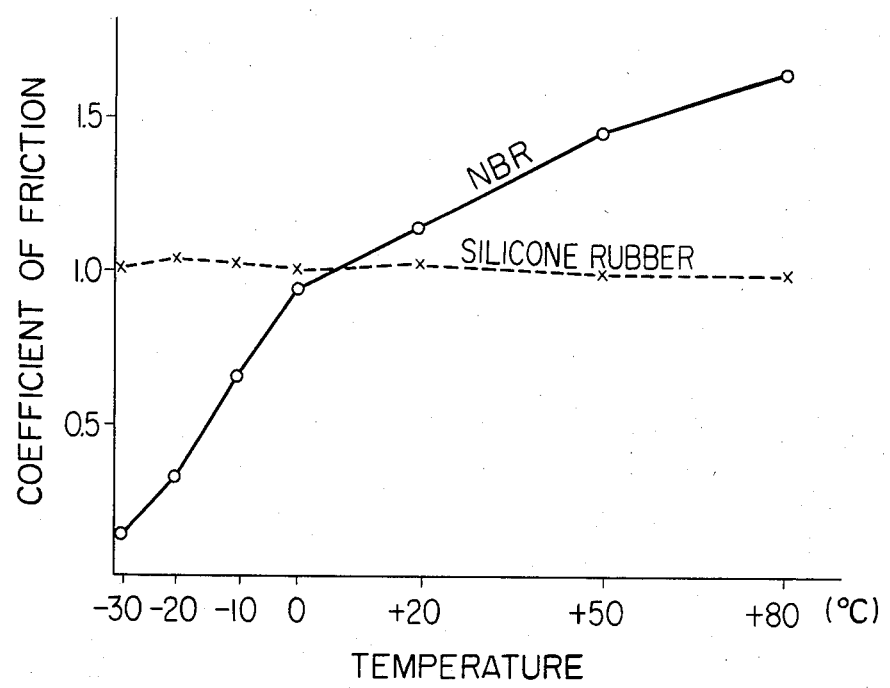
FIG. 3 is a graph showing the variation of the coefficient of friction with changes in temperature.

FIG. 3 is a graph showing the change in coefficient of a sliding friction as a function of temperature variation for silicone rubber (SR) and for neoprene butadiene rubber (NBR), from which it is clear that silicone rubber provides a nearly constant coefficient of friction over a broad temperature range from −30° C. to 80° C. while, in the case of neoprene butadiene rubber, the hardness goes up as temperature goes down and the coefficient of friction correspondingly decreases. For the use of neoprene butadiene rubber, therefore, this aspect must be considered.

The hardness and the coefficient of sliding friction of what have been judged in the experiment to be suitable as a material for the surface of the film winding member, are shown as follows.

|  | Silicone rubber A | Silicone rubber B | Silicone rubber C |
| --- | --- | --- | --- |
| Hardness (JIS K6301) | 51 | 54 | 59 |
| Coefficient of sliding friction | 1.75 | 1.75 | 2.00 |

(The hardness was obtained by measurement based on the Japanese Industrial Standard K6301, while the coefficient of friction was obtained by measurement based on the Standard of ASTM-D-1894-C. In the measurement rubber was put on a sled sliding on the emulsion side of the film; the measurement was carried out under the conditions as follows.

total mass of rubber and sled: 103 g
pulling speed: 100 mm/min
size of rubber: 42 mm × 15 mm It is a matter of course that the greater the coefficient of sliding friction of rubber, the more certain is the desired action effect and, as a material itself, it is possible to manufacture one with a coefficient of sliding friction that is too large to be measured. From a practical viewpoint of spool manufacturing, however, a coefficient of sliding friction of up to about 3.0 suffices since when the coefficient of friction is very large the material is soft, its mechanical strength and work efficiency in assembly are lowered, and machining for forming the component parts becomes difficult.

With the present invention, reliable loading and transporting of the film is rendered possible by the certain grasping and winding of the tip of the film transported by the sprocket in the automatic loading device for film by selecting the coefficient of sliding friction of a peripherally disposed material of the film winding member within a proper range. With proper selection, the function and effect of such material can be maintained over a broad range of temperatures from −30° C. to 80° C. and an automatic loading device with simple structure and reliable operation can accordingly be attained.

What is claimed is:

1. In an automatic loading device for film, a film winding member comprising;
   a tubular member having a peripheral surface about which film is operatively wound and formed of silicone rubber such that, as the leading edge of film is advanced into contact with said peripheral surface of said tubular member, the film leading edge is caused to be retained in wound relation about its peripheral surface by frictional contact between the film and said silicone rubber,
   an enlarged diameter portion of said peripheral surface for initial contact with a leading edge of film being wound about said film winding member, a first pressing means urging said film against said surface and located approximately at a point at which said film first approaches said winding member, and a second pressing means urging said film against said surface and spaced peripherally from said first pressing means.

2. The device of claim 1 wherein said first and second pressing means are rollers.

3. The device of claim 1 wherein said second pressing means exerts a greater force on said film than said first pressing means.

4. In an automatic loading device for film, a film winding member comprising;
   a tubular member having a peripheral surface about which film is operatively wound;
   a flange projecting radially outward from said peripheral surface at one end of said member for receiving a lateral edge of film operatively wound about the member; and
   an enlarged diameter portion of said peripheral surface adjacent said flange for initial contact with a leading edge of film being wound about said film winding member, said enlarged diameter portion being uninterruptedly smooth and continuous and being formed of silicone rubber such that, as the leading edge of film is advanced into contact with said enlarged diameter portion, the leading edge is caused to be retained in wound relation about its peripheral surface by frictional contact between the film and said silicone rubber, a first pressing means urging said film against said surface and located approximately at a point at which said film first approaches said winding member, and a second pressing means urging said film against said surface and spaced peripherally from said first pressing means.

5. The device of claim 4 wherein said first and second pressing means are rollers.

6. The device of claim 4 wherein said second pressing means exerts a greater force on said film than said first pressing means.

7. In a camera having an automatic loading device provided with a film winding member, wherein the leading edge of the film contacts and is adapted to be operatively wound about the film winding member, the improvement comprising providing the peripheral surface of said film winding member with silicone rubber so that the leading edge of the film contacting said peripheral surface of the film winding member adheres thereto by friction between the film and said peripheral surface to cause the leading edge to be operatively wound thereabout, a first pressing means urging said film against said surface and located approximately at a point at which said film first approaches said winding member, and a second pressing means urging said film against said surface and spaced peripherally from said first pressing means,
   wherein said first and second pressing means are rollers, and
   wherein said second pressing means exerts a greater force on said film than said first pressing means.

* * * * *